(12) United States Patent
Lunceford (10) Patent No.: US 7,945,628 B1
(45) Date of Patent: May 17, 2011

(54) METHOD FOR FACILITATING HUMAN SOCIAL INTERACTION USING A COMPUTING SYSTEM

(75) Inventor: Shane Troy Lunceford, San Jose, CA (US)

(73) Assignee: VaVu, Inc., Mountain View, CA (US)

( * ) Notice: Subject to any disclaimer, the term of this patent is extended or adjusted under 35 U.S.C. 154(b) by 385 days.

(21) Appl. No.: 11/836,692

(22) Filed: Aug. 9, 2007

(51) Int. Cl.
*G06F 15/16* (2006.01)
*G06F 9/46* (2006.01)
(52) U.S. Cl. .............................. 709/206; 709/227; 705/8
(58) Field of Classification Search .................. 709/206, 709/227–228; 705/8, 26–27; 715/963
See application file for complete search history.

(56) References Cited

U.S. PATENT DOCUMENTS

| | | | | |
|---|---|---|---|---|
| 5,691,917 A | * | 11/1997 | Harrison | 717/127 |
| 5,960,406 A | * | 9/1999 | Rasansky et al. | 705/9 |
| 7,359,946 B2 | * | 4/2008 | Thakkar et al. | 709/206 |
| 2005/0004983 A1 | * | 1/2005 | Boyd | 709/204 |
| 2007/0233736 A1 | * | 10/2007 | Xiong et al. | 707/104.1 |
| 2007/0239507 A1 | * | 10/2007 | Madhogarhia | 705/8 |
| 2008/0098079 A1 | * | 4/2008 | Sanghavi | 709/207 |
| 2008/0235084 A1 | * | 9/2008 | Quoc et al. | 705/14 |

OTHER PUBLICATIONS

Evite, Evite Frequently Asked Questions, www.evite.com/pages/custservice/faq.jsp dated to Jan. 27, 2006 via web.archive.org, 31 pages.*

* cited by examiner

*Primary Examiner* — Aaron Strange
(74) *Attorney, Agent, or Firm* — Shane T. Lunceford (57) ABSTRACT

Techniques for facilitating human social interaction, such as dating, through a computing system are disclosed. A logical representation of a social interaction called an event is created. The event is proposed to a second user for the system by the user that created the event. A response from the second user determines the communications paths available through the system. In one example, a positive response from the second user allows further communication between the users via a web-based messaging system. Methods of advertising and matching using this system are also disclosed.

34 Claims, 7 Drawing Sheets

| Requestor ID | Requested ID | Event Container ID | Response | ... |
|---|---|---|---|---|
| 654821 | 21246 | 21545 | 1 | ... |
| 132156 | 854233 | 56874 | 0 | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |
| ... | ... | ... | ... | ... |

410 — Requestor ID
420 — Requested ID
430 — Event Container ID
440 — Response

METHOD FOR FACILITATING HUMAN SOCIAL INTERACTION USING A COMPUTING SYSTEM

FIELD OF THE INVENTION

The present invention relates generally to web pages. More specifically, a system and method for facilitating human social interaction using a web page is disclosed.

BACKGROUND INFORMATION

Online dating websites currently rely on "profile" related data collected from the user to "match" people with one another. This profile data is meant to describe a user's personality and may include information such as favorite music, astrological sign, or religion, or may be the result of more complicated personality tests. Examples of such services include match.com and eharmony.com.

Once a user creates a profile on a web-based service, it is common for a process to perform a compatibility check to determine if the new profile "matches" other profiles already in the system. Matched users will be notified of the match. Users are required to take further action if interested in pursuing a relationship. Such action may include sending an indication of interest to the other user through the facilitating site.

Some sites use complex algorithms and extremely detailed personality profiles or tests to facilitate "matches," but it is most common to allow users to search one another's pseudo-anonymous profiles based on more superficial factors. These factors often include location information, sexual orientation, age, race, and religion. Once a match or list of matches is made, a user can often view a photo of the users listed.

Current online dating software is concerned with finding a personality or superficial match based on profile data. The "match" introduces purported compatible people to one another with the hope or expectation that the personality compatibility will ensure that the users enjoy one another's company. The focus is on the "match" rather than the "date." Likewise, websites focused on sending invitations to users, such as evite.com, have no matchmaking focus.

SUMMARY

A method for facilitating social interaction between people is disclosed. The creation of event objects that represent social interaction between people enables users of the system to search for people with like interests based on saved events, and to propose events to other users in an effort to entice people into a social interaction. Methods for event creation, system operation, matching users, and advertising systems are discussed in the specification.

BRIEF DESCRIPTION OF THE DRAWINGS

The present invention is illustrated by example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well known structures and devices are shown in block diagram form in order to avoid unnecessarily obscuring the present invention.

Overview and Definitions

Before discussing the functional aspects of embodiments of the invention, the concept of an event will be explained. In the context of online dating, an event is a logical representation of something that a user may wish to do on a date or extended social interaction. This includes a wide variety of things to do, such as taking a walk in a park, going to see a movie (as well as going to see a specific movie), flying to the Bahamas, skydiving, or simply having dinner.

An event is not, however, common profile information. Common profile information often includes attributes that describe an individual. With traditional online dating sites, users often search for one another based on these attributes. A user may list his or her astrological sign, personality type, or the results of a social attributes test such as a Meyers-Briggs test. A key difference between an event and a personal attribute is that an event is something that the user actually wants to do on a date. While a user of a traditional dating website may say "I like walks on the beach," it is not the same as saying "on my first date with you, I want to take a walk on the beach." It would be highly unusual, for example, to see a user profile stating "I would like to go to Teatro Zinzanni for a dinner theatre experience on May 20 at 7:00 pm." An event, on the other hand, is capable of containing such information. In one embodiment, an event is an activity that is planned for the future.

While the systems and techniques discussed herein explain embodiments of the invention in the context of online dating, other forms of human social interaction are within the scope of embodiments of the invention. For example, social networking sites may wish to incorporate embodiments of the invention in order to allow interaction between users in a less romantic context.

A user is defined as one who uses the system. It is not necessarily a requirement that a user be "registered" or otherwise formally identified by the system in order to use the system or its features.

Proposing an event, in the context of online dating, represents asking someone on a date that includes the particular event. More than one event may be proposed at one time. In this case, individual events are grouped together and the group of events is used by one user to ask another user on a date. A date may, but does not need to, specify a specific day or time.

Structural Overview

Figure 1:
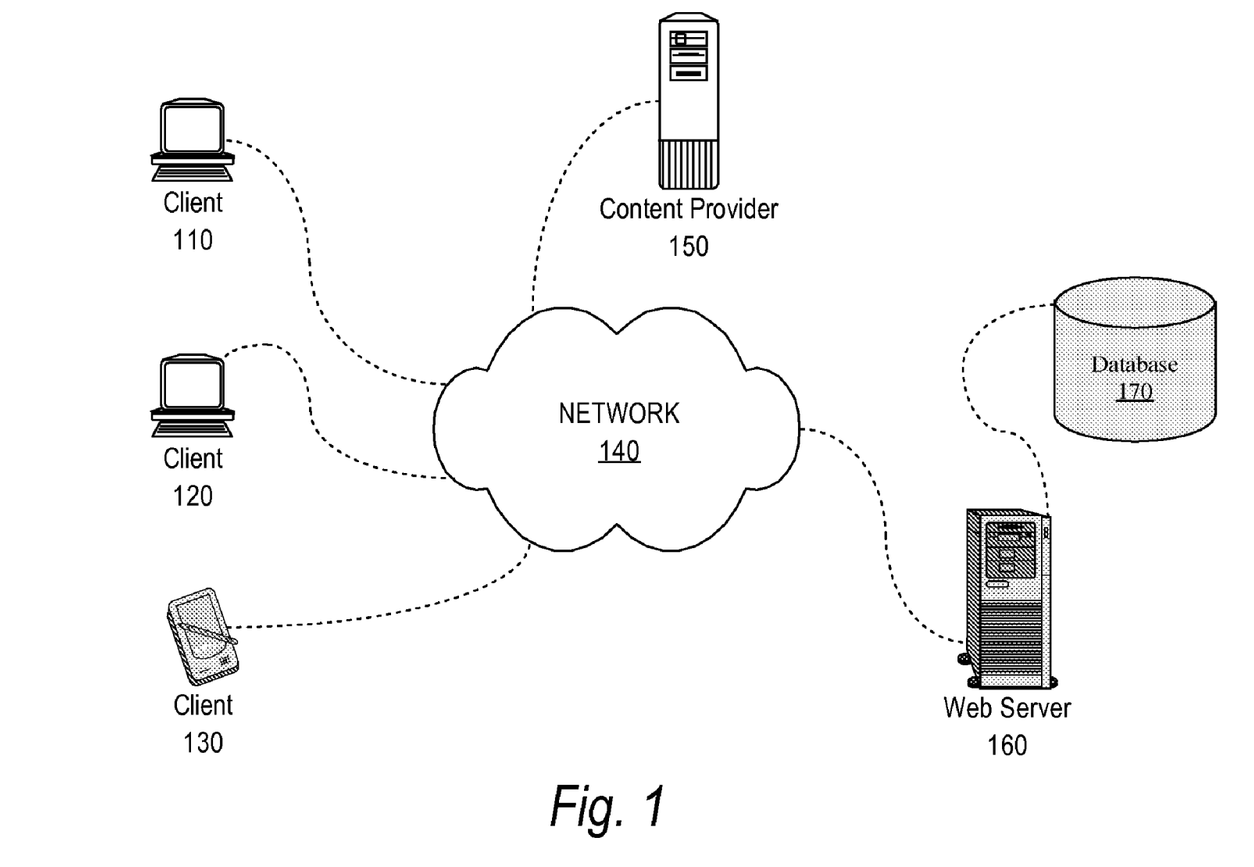
FIG. 1 is a block diagram illustrating an example of a system on which an embodiment of the invention may be implemented.

In an embodiment of the invention such as the embodiment illustrated in FIG. 1, a user of client 110 may wish to create an event and use that event to propose a social interaction to the user of client 120 or the user of mobile client 130. A diagram representing one possible structure of an event can be found in FIG. 3. Events 310-A and 310-B are the same event. Events 310-B, 320, 330, and 340 may be contained in an event container 350. Any number of events 320 may be contained in an event container 350, and an event container 350 may be used to propose social interaction as if the event container 350 were a single event 320.

Client 110, in an embodiment, connects to web server 160 via the network 140 and makes a request to create an event 320. Event information may be manually entered by the user and transmitted to web server 160, in which case the event 320 will be stored in database 170. This particular flow of information is not necessary, however.

For example, web server 160 may communicate event information from a separate content provider 150 to client 110 to assist the user in creating an event 320. Alternatively, client 110 may connect directly to content provider 150 in order to create an event 320. Through interacting with content provider 150, a request may be made to web server 160 to create an event 320. The event 320 will then be stored in database 170 or other storage means.

Once the event 320 is created, in one embodiment client 110 makes a request to web server 160 to propose one or more events 320 to another user of the system. Such a user may use client 120, client 130, or both client 120 and client 130. In one embodiment, web server 160 communicates the proposed event 320 to client 120.

Functional Overview

Figure 2:
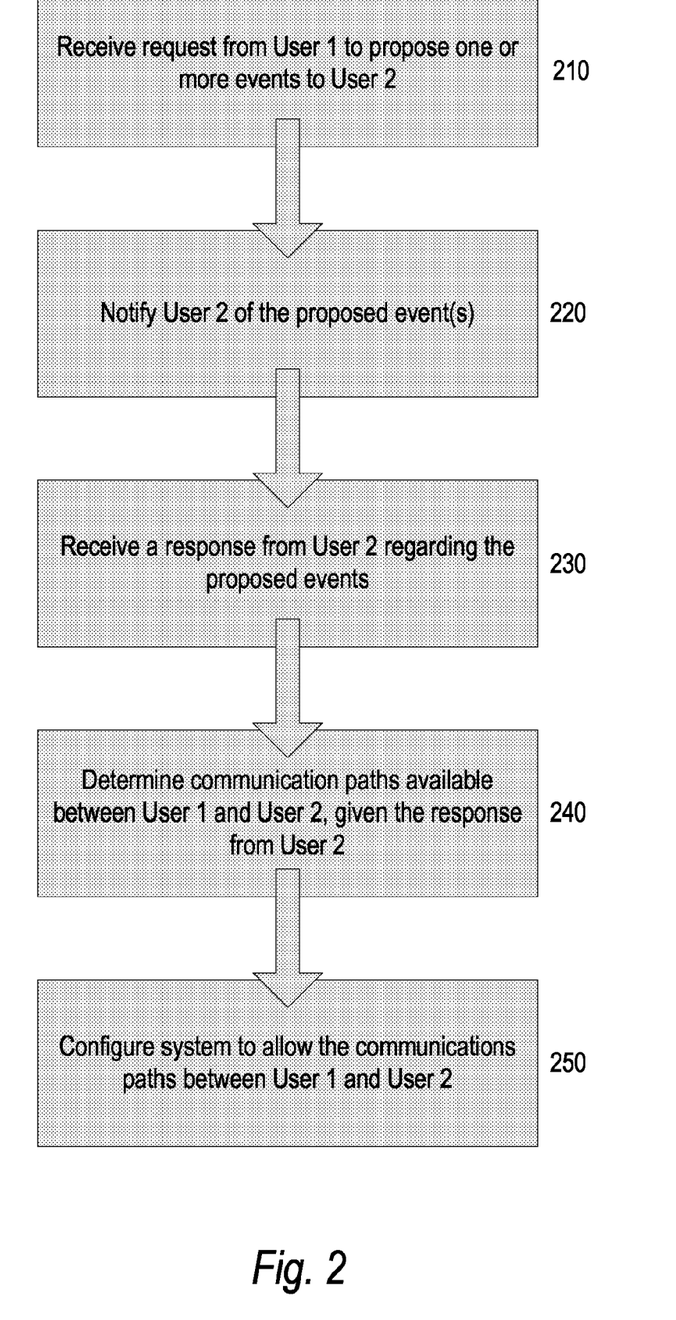
FIG. 2 is a flow diagram that illustrates an example of a technique for facilitating social interaction between users of a computer system.

At step 210 in FIG. 2, the system 160 receives a request from a user to propose one or more events 320 to a second user. In this embodiment, at step 220, the system notifies the second user of the proposed events 320. The system then receives a response from the second user regarding the proposed events 320 at step 230. At step 240, communication paths through which the users are allowed to communicate with one another are determined. These communication paths may include instant messaging or other web-based messaging system (both real-time and non-real-time), mobile text or video messaging, e-mail, or other communication means. The system is then configured at step 250 to allow the determined communication paths.

Creating an Event

An event 320 is usually created by a user of the system. The user may create an event 320 manually, in which case he will be prompted for information regarding the event 320. Event categories, suggestions, and other information may be displayed to the user in order to assist in the creation of the event 320. The user may enter as many attributes of an event 320 as he wishes. For example, the user may choose to define only a title of an event 320 and the name of the place, such as a restaurant, at which the event 320 will occur. Alternatively, the user may choose to define a specific date and time, or even a particular menu item if he wishes.

Figure 5:
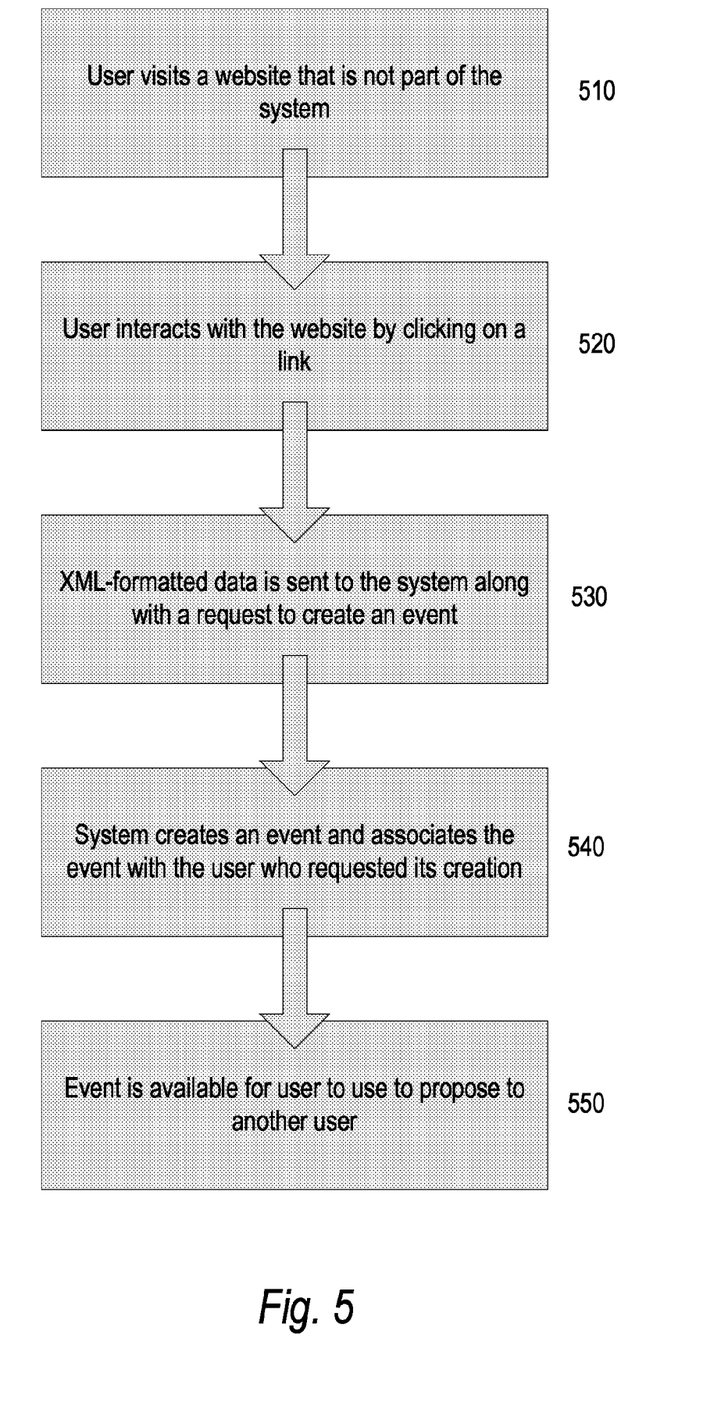
FIG. 5 is a flow diagram that illustrates an example of a technique for creating an event.

Events 320 may be created by a user by simply selecting (or "clicking on") an advertisement displayed by the system or another source, such as a third party website 150. In the embodiment shown in FIG. 5, a user visits a website 150 that is not part of the system at step 510. At step 520, the user interacts with the website 150, which causes XML-formatted data to be sent to the system along with a request to create an event 320 at step 530. At step 540 in the embodiment, the system creates and associates the event 320 with the user. The event 320 is then available for the user to use to propose the event 320 to another user.

In one embodiment, the request by the user can cause the system to create a copy of a previously stored event (a "parent" event), along with a reference back to the "parent" event. This reference allows users to be matched based on selections of the same events, along with other statistic gathering advantages. A reference to the user that created the event 320 may also be created. A non-registered user of the system may be prompted to create an account with the matchmaking service at this point, but this does not preclude the creation of the event 320.

Another way a user may create an event 320 easily is to select an event 320 created by a different user of the system. Users may be given the option to allow other users of the system access to view saved events 320 associated with the user. These other users may then select the event 320 and choose to make a copy. These other users may then be associated with the new copy. In such a case, a reference may also point to the parent event. A tree of parenthood may be created that may assist in matching. For example, if User1 creates an event 320, and User2 makes a copy, then that copy will reference the event 320 created by User1 as that copy's parent. User3 may make a copy of the event 320 created by User2, and the event 320 created by User3 may point to the event 320 created by User2 as its parent. Alternatively, parenthood may be inherited, and User3's event 320 may inherit the parent of User2's event 320, and therefore list the event 320 created by User1 as the parent of User3's event 320.

One way of assisting users in creating events 320 is to suggest events 320 to them based on the user's local zip code and popularity. Users may search the system for "restaurants," and the system may return a list of restaurants within a 15-mile radius of the user's specified location. Such information may be determined from a local database 170, or even a third party database 150.

Examples of proprietary databases 150 capable of providing such information include Yahoo! Local and Google Local. These content providers 150 have Application Programming Interfaces (APIs) that allow a search query to be submitted, and will return results that may be used to create an event 320. The system may submit a search to Yahoo! Local requesting all matches to the query "pizza" near the zip code "95122." Yahoo! Local will retrieve relevant information and deliver the matching items to the system in XML format. These items typically include the name, address, phone number, and website of the business, along with other relevant information. A user can choose a business from the list and then use this information to create an event 320, rather than typing the information manually.

Third party software may also be used to create events 320. An API may be set up on the system to allow users of third party software to create events 320 on the system in an automated manner.

Storing Events

Figure 3:
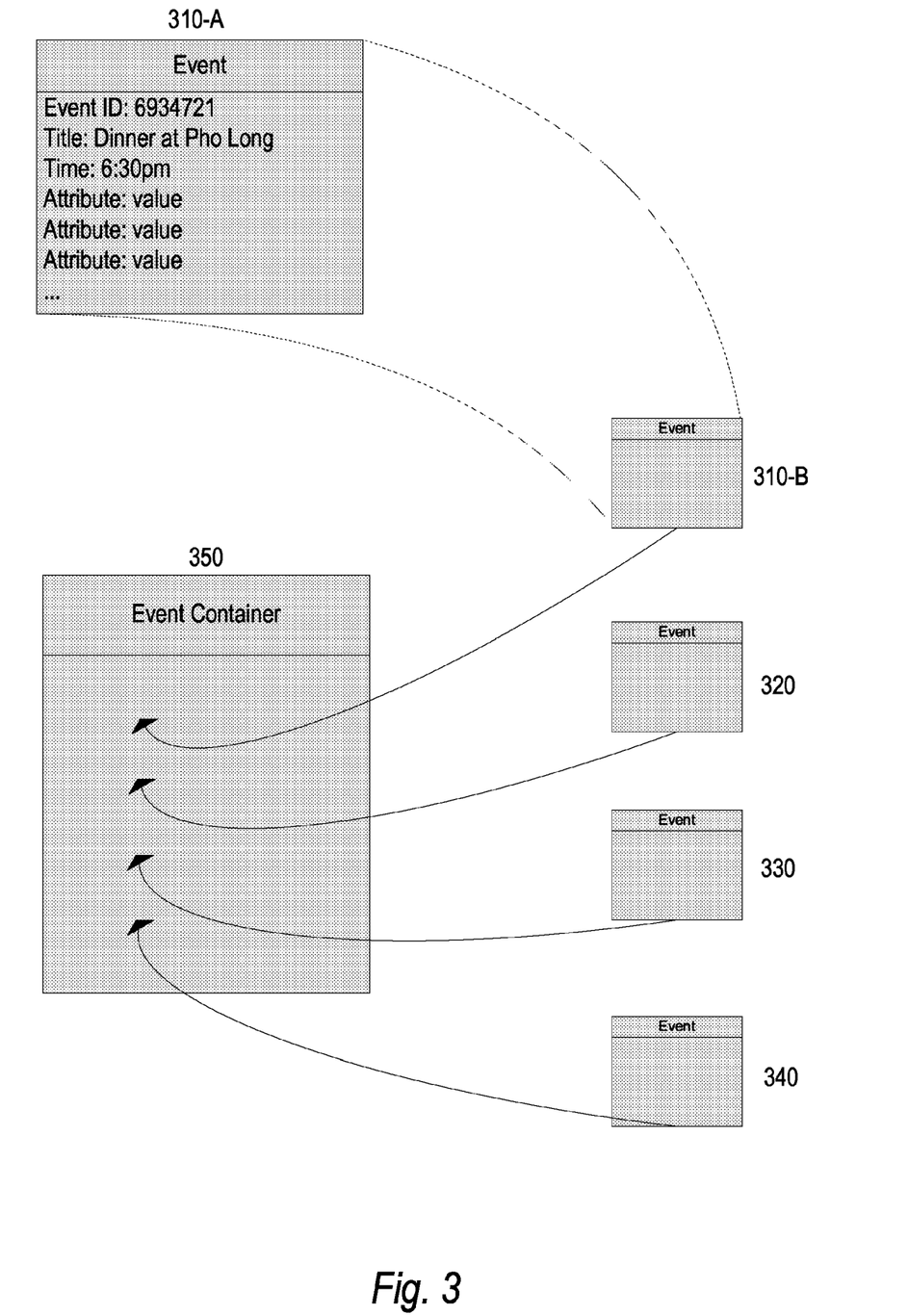
FIG. 3 is a block diagram that illustrates examples of logical structures of events and an event container containing events.

In an embodiment of the invention, events 320, when created by a user, are stored in a database 170, along with a reference to the user's identification number on the system. The database 170 holds all information about the event 320. The data may be stored in any of a variety of ways. For example, the database 170 may be designed to hold all restaurant data in one database table and movie data in a separate table. Alternatively, one table may hold every event 320. If multiple events 320 are to be used in the same proposal using a database-driven system, then an event 320 container can be created. The event container 350 may reference each event the container contains, or, alternatively, each event contained by the container 350 may reference the container.

Events 320 may also be stored in XML files or any other storage mechanism. An event 320 stored in XML format may take on the following form:

```
<EVENT>
<ID>
   923048564
</ID>
<TITLE>
   Dinner Theatre
</TITLE>
<LOCATION>
   Teatro Zinzanni
</LOCATION>
<ADDRESS>
   29 Pier
</ADDRESS>
<CITY>
   San Francisco
<CITY>
<STATE>
   California
<STATE>
<ZIP>
   94111
<ZIP>
<EVENT>
```

Using XML elements is not required even if XML is meant to be the storage preference. An EVENT element may simply contain its attributes. This method may assist in efficiency in cases where elements are not expected to go more than multiple levels. Finally, a mixture of elements and attributes may be used.

Additionally, more than one event 320 may be stored in the same XML document. This allows more than one event 320 to be used for a single proposal.

In an embodiment of the invention, the event 320 contains a reference back to the user that created the event 320. When creating an event 320 based on another event 320 previously created by another user of the system or an advertiser, a copy of the event 320 is made on the system to allow the copying user to customize the event 320. The reference to the copying user in the event 320 allows a user to have a list of favorite events 320 to use as proposals to other users of the system.

A user may also be given the option to make an event 320 public or private. If the event 320 is set to "private," then the event 320 may not be viewed by other users of the system. If the event 320 is set to "public," then other users of the system may view the event 320 and make copies of the event 320. Other levels of access may be provided. One embodiment allows only "connected friends" of the user to see a user's events 320. These "connected friends" may be people that the user has voluntarily made a connection with through the system.

The storing of events 320 is not limited to general users of the system. For example, advertisers, system administrators, and others given access by the system operators may store events 320 on the system. Advertisers, for example, may create events 320 that they believe will be popular, and may post the events 320 with a price they are willing to pay for each event 320 to be displayed to a user if the user types in certain key words. In this case, an API would be created to allow users to automate this bidding process.

Other methods known to a person skilled in the art may also be used to create events 320, such as form submission from third party websites 150, mobile applications, embedded applications, as well as self contained programs that are platform independent, such as Flash and Java.

Searching by Events

In one embodiment, before a user can actually put an event 320 to use, he finds another user to which to propose the event 320. There are several ways to search for users based on event 320 information. These methods of searching may be combined with more traditional searching methods, such as searching based on user profile information.

A user may simply search for another user based on specific text that may show up in an event 320. This allows the user to find another user who is interested in the same activities as the user is. For example, a user may be searching for someone who wishes to attend the upcoming U2 concert. The user may use search terms such as "U2" or "U2 Concert" to search events 320. The search mechanism may then find event 320s that (a) have been created by users and (b) match the search query. The search mechanism may display all or a portion of the results to the searching user. The results may include information about each event 320, as well as information about the user who created the event 320, including profile information and pictures. The searching user may choose the most appropriate match from the list.

A user may also find an event 320 that the user finds interesting, and select an option to search for users that have created a matching event 320. For example, the user may find an advertised event 320 entitled "London Symphony Orchestra" and make a request to the system to return a list of events 320 matching the advertised event 320. The system may search for events 320 that are copies of the advertised event 320 in an embodiment of the invention that enables users to make copies of events 320 with a reference to the parent event 320. These would be near-certain matches.

The system may also attempt to find matching events 320 based on the text in the advertised event 320. For example, the system may also look for events 320 not having a reference to the advertised event 320 as a parent, but which contain words matching "London Symphony Orchestra" in the title. A match may contain some or all of the words searched for. Alternatively, a match may contain only synonyms of the words defined by the system.

A user may also search for matches based on non-advertised events 320. Since users may create events 320 by copying events 320 from one another or advertisers, a first user may find an event 320 created by a second user and then choose to look for others that have created the same event 320. Since the event 320 may have a parent, the system may find other events 320 in the "family tree" of events 320, or events 320 the have a referenced relationship by traversing the family tree of parenthood. Alternatively, if parenthood is inherited when an event 320 is copied, then the system may find all events 320 with the same parent as the event 320 with which the search was initiated. An event 320 may even have a parent event 320 and a "root" event 320, denoting the immediate parent as well as the root parent. If the event 320 is a parent event 320, then the system may find all events 320 that are copies of the event 320 from which the search was initiated. If the event 320 from which the search is initiated is not a parent or child of another event 320, then a text search may be utilized in an effort to find matching events 320.

Automated Event Matching

The system may inform a user of matching events 320. This may happen in several ways.

A user may set up a series of search terms for which he wishes to be notified in the case of a second user of the system creating an event 320 that matches the search terms. The system may run the query at predetermined or user defined frequency. Matches will result in a notification to the user informing the user of the match.

Any notification from the system may be via a web based messaging system, e-mail, mobile text message, video message, audio message, or any other means of notification initiated by the system. Such a notification may even be accomplished by displaying the results of the search to the user at each login to the system.

Another method of matching based on events 320 searches at a predetermined or user defined frequency for all events 320 matching an event 320 created by a particular user. For example, if user1 creates an event 320, then the system may search for other events 320 that match the event 320 created by user1. This search may be done by text, family tree, or other search methods. The system then notifies user1 of matching events 320. Also, the system may notify the user creating the matching event 320 of the match. This notification may display the event 320, profile information of a user who created a matching event 320, or any other relevant information associated with the event 320.

Proposing an Event

Once a first user has found a second user that seems appealing, it is time to propose one or more events 320 to that second user. In an embodiment of the invention, the first user selects one or more events 320 that he wishes to use as a proposal to a second user. The first user then chooses a second user to propose the events 320 to. The combination of these two selections results in a request to the system to propose the selected event 320 or events 320 to the selected user.

Figure 4:
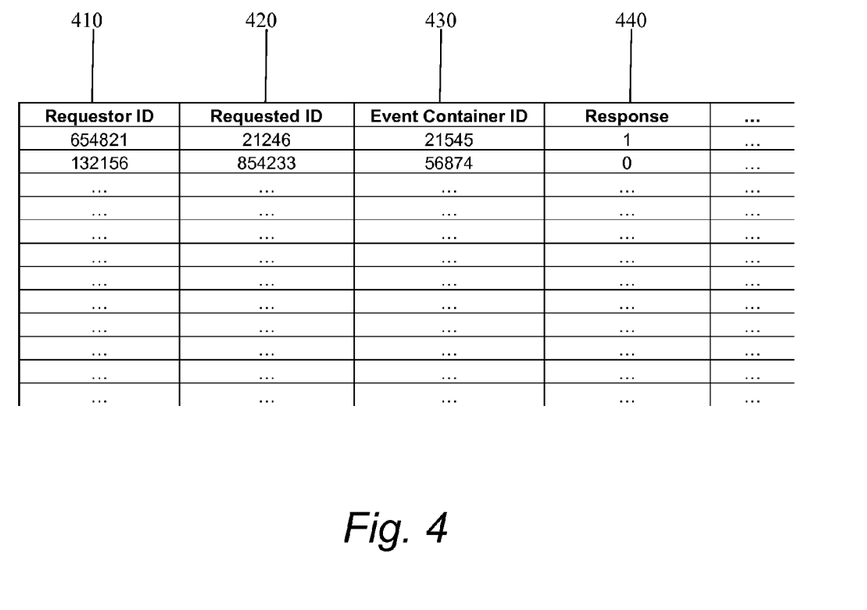
FIG. 4 is a table that illustrates an example of a database table containing event proposal information.

In one embodiment of the invention, event proposals may be stored in a database table, as shown in FIG. 4. Information such as the requestor ID 410, requested user ID 420, an event container ID 430, and the response to the proposal 440 may be stored in such a table. Any information relevant to an event proposal may be stored in a table or combination of tables.

In an embodiment of the invention, a user is not restricted to proposing an event 320 previously saved in his favorite events list. He may find a user that already has a favorite event 320 picked out, and choose to propose the other user's event 320 to that other user (this may increase the chances of a positive response).

Once the system has received the request to propose an event 320 to the second user, the system associates the second user with the event 320. This can be done in many ways. In one embodiment of the invention, this is accomplished with a proposals table that holds a list of proposed events, along with the associated proposing users, as well as the uses to which the event 320 was proposed.

The second user is then notified of the proposed event 320. This may be done by a web based messaging system, mobile text message, e-mail, or any other means of delivery.

The second user may then respond to the proposal by accepting the proposal, rejecting the proposal, or otherwise responding. Other responses may include refusal to allow a particular user to propose events 320 again (blacklisting), a response indicating interest, however requiring more information, or other levels of response.

In an embodiment of the invention, if the second user accepts the proposal, then additional communications paths are opened between the users through the system. These communications paths may be user defined, or system defined. For example, an accepted event 320 may result in the system creating the ability for the first user and second user to communicate with one another through a web based messaging system. A table of communication rights may determine which users are entitled to communicate with other users of the system in which ways. For example, a table entry may show user1's ID and user2's ID, as well as which communication methods are available for communication between the two users.

Alternatively, the system may reveal contact information about the users to one another. This may include e-mail addresses, phone numbers, or other personal contact information. Temporary e-mail addresses may even be created for each user on the system for use with this interaction, so users may use a familiar communication mechanism (e-mail) without sacrificing privacy. These temporary email addresses may be deleted from the system at any time specified by the user or the system.

Other methods of communication are also capable of being facilitated by the system, such as instant messaging, chat, or Voice Over Internet Protocol (VOIP). All of these and other methods of communication are within the scope of embodiments of the invention.

External Modules

Social networking websites such as MySpace and FaceBook allow an opportunity for users to display the user's favorite events 320 to their friends. External modules allow users to list at least a portion of the user's favorite events 320 on a website of the user's choice.

In one embodiment of the invention, these modules are created by the user inputting the URL of the website on which that user wishes to post the list of events 320 into a form after logging into the system. The form then generates code for the user to post on the website of that user's choice. This code may be in any language supported by web servers.

After the user posts the returned code on the website of their choice, when the code is accessed, a request is made to the server to display a list of events associated with the user that created the code. To avoid misuse, a request may be verified by the system by comparing the URL of the requesting page with the URL entered at the time of creation.

Once the events 320 show on the user's website, those viewing the website will be able to see the events 320 and select the events 320 to navigate to a page within the system. The viewing user may then propose an event 320 to the user that posted the event module on the web page.

Mobile Devices

Given the proliferation of smart-phones 130, personal digital assistants 130, and other mobile devices 130, as well as the ongoing convergence of mobile devices 130 and more traditional home computing, such technologies are recognized and within the scope of the invention.

Alternative Embodiments

Although the embodiments discussed throughout the specification describe a single user proposing one or more events 320 to a single second user in the context of online dating, embodiments of the invention are not so limited. As discussed before, embodiments of the invention may be used in the context of social networking or other forms of human interaction. Furthermore, embodiments of the invention are not limited to a single user proposing events 320 to a second single user. Embodiments of invention may be used to allow group dating, where several users each propose the same event 320 to separate partners.

Also, a user may propose a list of 10 events 320 to a second user and ask the second user to choose three of the events 320. Likewise, a user may view a list of events 320 that a second user has "packaged" together. The package may offer the ability to choose a subset of the events. The first user may choose several of the events 320 and then use this subset as a proposal to the second user.

These and other alternative embodiments of the invention will be recognized by one skilled in the art, and are within the scope of embodiments of the invention.

Advertising and Business Method

The introduction of the event 320 structure into online dating and other social interaction websites and mobile device 130 applications brings new marketing and business opportunities.

Advertisers on web sites typically have the goal of driving traffic to a particular website by placing advertisements on high-traffic websites that attract a target demographic. An advertiser pays a web site operator a sum of money to place an ad on the advertising web site. The goal is that a user of the advertising web site will then view the advertisement, select the advertisement by "clicking" on the advertisement, and then be redirected to the advertiser's web site. From there, it is up to the advertiser to have a web site that is intriguing enough to convince the user to participate in some commercial related interaction, resulting in the sale of a product or service, or other method of leveraging the user in such a way that money is gained for the advertiser.

The goal of an advertisement on an embodiment of the invention is the same—financial gain through commercial interaction. The difference lies in the method of achieving that goal. A successful advertisement will result in the creation of an event 320, rather than redirection to the advertiser's website. Since the generation of an event 320 by a user of the system represents some level of commitment to use the event 320 to propose a date or other social interaction to another user of the system, it is useful for advertisers to allow the system operator to take on the final step of converting the user into a sale of goods or services.

For example, a traditional dating website may host an advertisement for a restaurant, such as Maggiano's Little Italy. A user of the website may click on the advertisement, calling a redirection script that tracks the click and redirects the user to the Maggiano's website. At this point, the role of the website is finished. Payment for the advertisement may be provided in a lump sum, in an amount based on the number of click-throughs, or a combination of the two.

In an embodiment of the invention, an advertiser, such as the restaurant Il Fornaio, may pay to place an advertisement on the system. A user of the system viewing the advertisement may choose to select the advertisement by clicking on the advertisement. After the user selects the advertisement, steps are taken that lead to the creation of an event 320 on the system. This may happen in several ways.

For example, once an advertisement is selected, an event 320 may be created for the user immediately and placed in the user's favorite events. This allows the user to quickly find a pre-built event 320 to propose to a second user.

Other advertisements may give the user the expectation that more information about the advertised goods and services will be displayed after the user selects the advertisement. In such cases, a user may be directed to a web page within the system that describes the goods and services in full detail. Also on the web page may be a call to action that, when selected, will create an event 320 on the system. There may be more than one option given to the user to customize the event 320 before the event's creation. This may be useful if a particular performance night of a ballet is selected, for example.

An event 320 may also contain metadata about the advertiser, assisting the user in the final purchase. For example, the user that created an event 320 representing a particular performance night of a ballet may propose the event 320 to a second user of the system, who accepts. The first user (or even the second user) may receive a notification from the system with metadata contained in the event 320, such as a link to a website allowing the user to purchase tickets for the ballet.

Alternatively, an advertisement may take the user to a web page that actually allows the user to purchase tickets for the ballet. After the purchase, an event 320 may be created. This event 320 may even contain an attribute showing that tickets have already been purchased for the ballet. Such an indication may be more enticing to the user to which the event 320 is proposed, especially for sold-out showings of concerts and the like.

An advertiser may wish to retain control of the website to which the user is redirected, however. In this case, the user may be redirected outside of the system. The advertiser's website may then allow the creation of an event 320 through a call to the system. This may happen before or after a purchase, but the result is the creation of an event 320 with which the user intends to propose to another user of the system.

In each of these advertising methods, there are new points of possible financial interaction between the advertiser and the system operator. An advertiser may be charged:
- for the initial posting of an advertisement on the system;
- each time an event 320 is created;
- each time a user proposes an event 320 created via the advertisement to another user of the system;
- each time a user accepts a proposal that contains an event 320 created via the advertisement;
- each time a purchase is made as a result of the advertisement;
- each time an event 320 created via the advertisement is copied by another user of the system; and
- at any other point along the interaction between the user and the system that has to do with the advertisement or an event 320 created with the advertisement.

Figure 6:
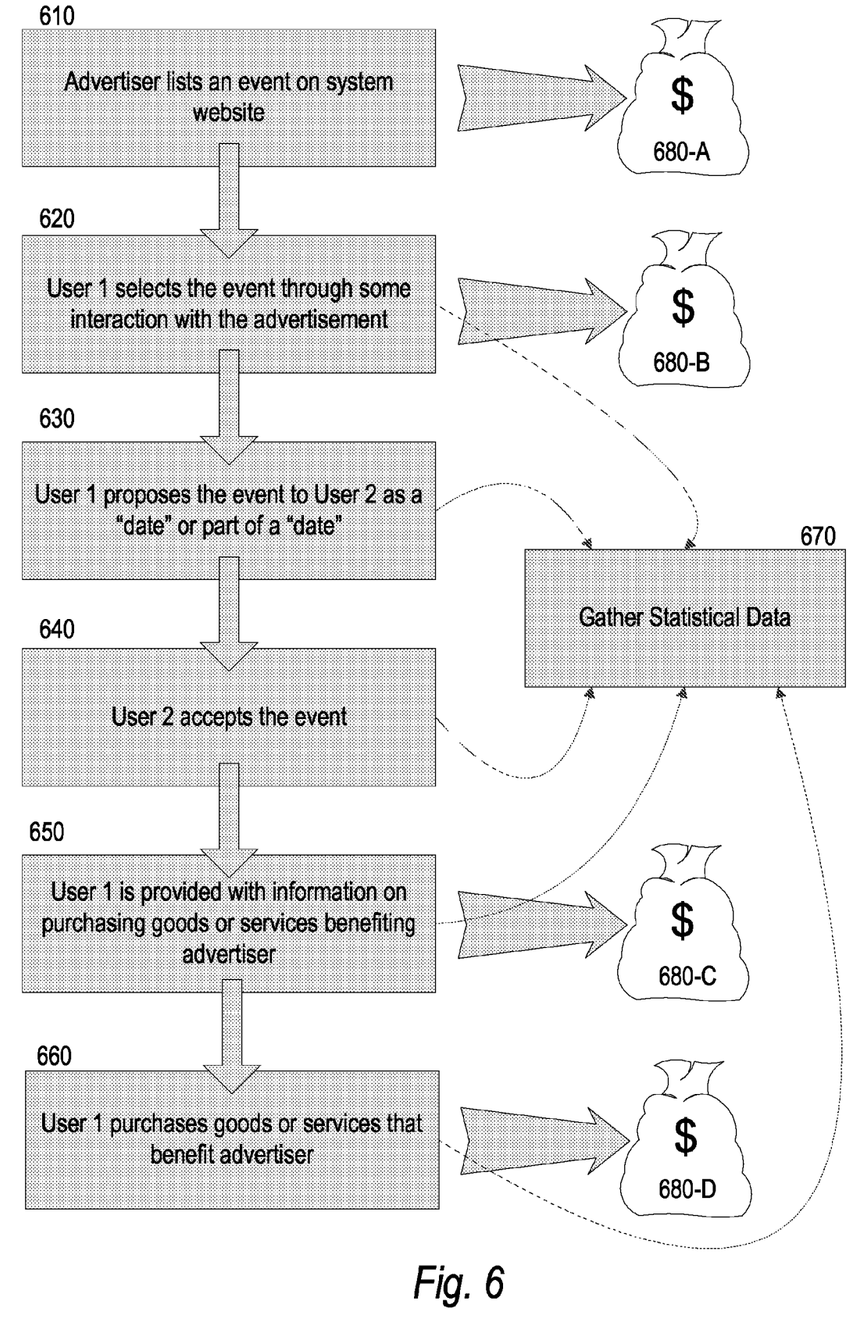
FIG. 6 is a flow diagram that illustrates an example of a technique for generating advertising revenue from an online social interaction facilitation site that uses events.

FIG. 6 shows an overview that brings attention to some possible points of financial interaction between the advertiser and the system operator. At step 610 in the embodiment shown, an advertiser lists an event on the system website. A user selects the event by interacting with the advertisement at step 620. This may be done by clicking on a link or any other selection method. At step 630, the user proposes the event 320 to a second user. At step 640, the second user accepts the event 320. The first user is then provided with information on how to purchase goods or services from the advertiser at step 650. At step 660, the first user purchases goods or services from the advertiser. In this embodiment, steps 620-660 may result in step 670, the gathering of statistical data. Although money or consideration may be transferred at any point in this flow chart, the embodiment in FIG. 6 shows the potential for such a transaction at steps 610, 620, 650, and 660, resulting in steps 680-A, 680-B, 680-C, and 680-D, respectively. At 680-A, 680-B, 680-C, and 680-D, the system operator may benefit financially from the advertiser.

Implementation Details

Hardware Overview

Figure 7:
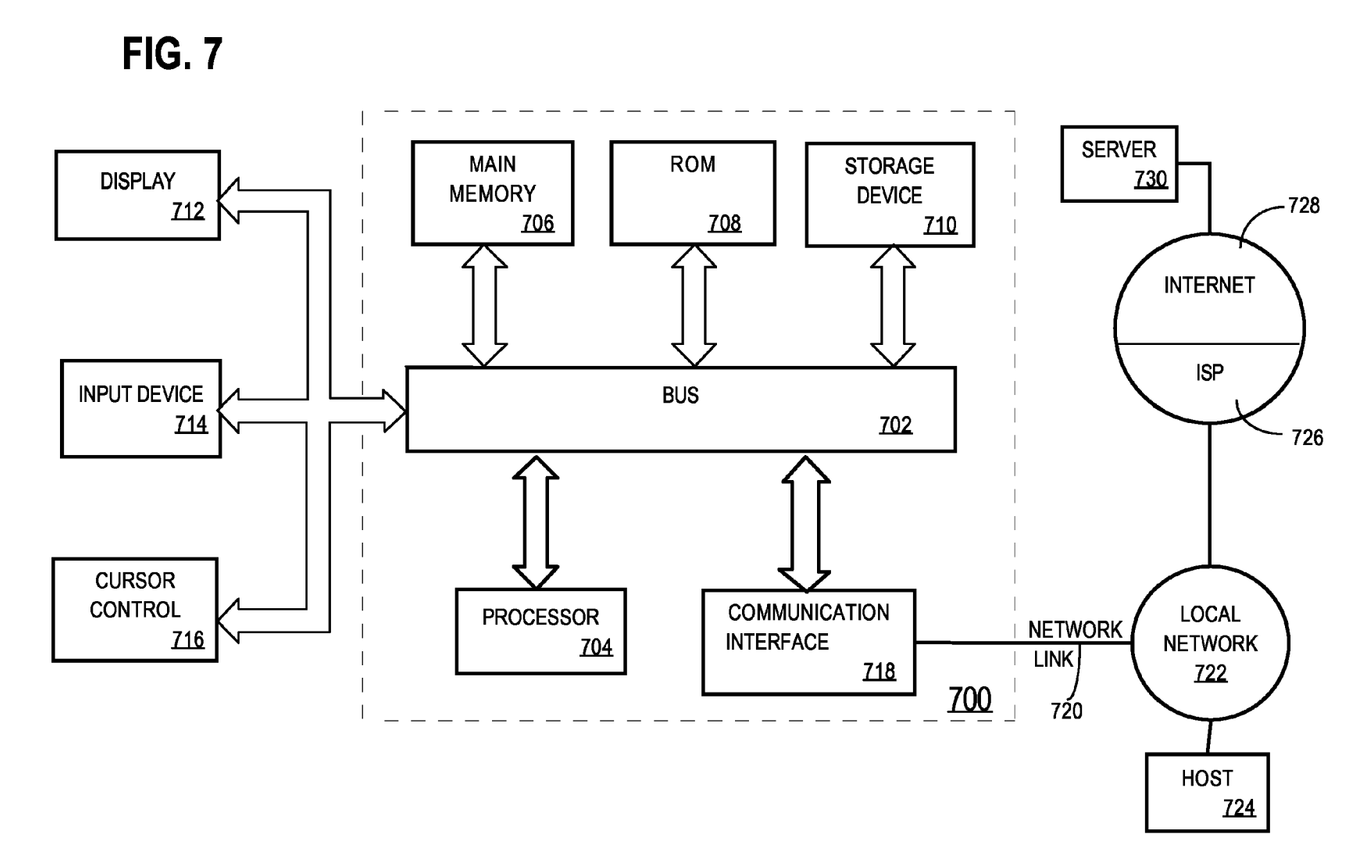
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method using an online social interaction system, the method comprising:
    receiving a request to associate a plurality of events with one another on the system as a combination of events, wherein the plurality of events include:
        a first event associated with a first event identifier; and
        a second event associated with a second event identifier that is unique relative to the first event identifier;
    wherein events are logical representations of real-world activities;
    associating the first event identifier and the second event identifier with an event container identifier;
    receiving a request from a first user of the system to propose the combination of events to a second user of the system, wherein the request to propose the combination of events explicitly identifies the second user and the event container identifier;
    notifying said second user of said combination of events;
    receiving a response from said second user, wherein the response is associated with said combination of events;
    determining one or more communication paths available on the system that is not configured on the system as an available communication path between said first user and said second user;
    based on the response from said second user, configuring the system to make available said one or more communication paths between said first user and said second user, enabling the first user and the second user to communicate with one another using the one or more communication paths;
    wherein the method is performed by one or more computing devices.

2. The method of claim 1, further comprising storing one or more of said plurality of events on the system by said first user.

3. The method of claim 1, further comprising storing one or more of said plurality of events on the system by said second user.

4. The method of claim 1, further comprising storing one or more of said plurality of events on the system by a third user of the system, wherein said third user is not said first user and said third user is not said second user.

5. The method of claim 1, further comprising storing one or more of said plurality of events on the system by an advertiser, wherein said advertiser is not said first user and said advertiser is not said second user.

6. The method of claim 1, further comprising storing one or more of said plurality of events on the system by a system administrator, wherein said system administrator is not said first user and said system administrator is not said second user.

7. The method of claim 1, wherein said plurality of events are previously stored on the system in response to receiving a request from a user, wherein said request is initiated from a website that is not part of the system.

8. The method of claim 1, wherein the step of configuring the system, based on the response from said second user, comprises allowing communication between said first and second users via a web-based messaging system.

9. The method of claim 1, wherein the system, based on the response from said second user, allows communication between said first and second users via e-mail.

10. The method of claim 1, wherein the system, based on the response from said second user, allows communication between said first and second users via a mobile device.

11. The method of claim 1, further comprising:
    receiving a selection of a subset of said plurality of events; and
    communicating said selection to said first user of the system.

12. The method of claim 1, wherein sending said notification to said second user comprises delivering said notification via e-mail.

13. The method of claim 1, wherein sending said notification to said second user comprises delivering said notification to a mobile device.

14. The method of claim 1, further comprising:
    in response to the response by said second user, sending a notification to first user.

15. The method of claim 14, wherein said notification to said first user comprises sending information facilitating a commercial interaction related to said one or more events.

16. The method of claim 14, wherein sending said notification to said first user comprises delivering said notification via e-mail.

17. The method of claim 14, wherein sending said notification to said first user comprises delivering said notification to a mobile device.

18. A computer-readable non-transitory storage medium containing one or more sequences of machine-readable instructions that, when executed by one or more processors, cause the one or more processors to perform the steps of claim 1.

19. A computer-readable non-transitory storage medium containing one or more sequences of machine-readable instructions that, when executed by one or more processors, cause the one or more processors to perform the steps of claim 2.

20. A computer-readable non-transitory storage medium containing one or more sequences of machine-readable instructions that, when executed by one or more processors, cause the one or more processors to perform the steps of claim 3.

21. A computer-readable non-transitory storage medium containing one or more sequences of machine-readable instructions that, when executed by one or more processors, cause the one or more processors to perform the steps of claim 4.

22. A computer-readable non-transitory storage medium containing one or more sequences of machine-readable instructions that, when executed by one or more processors, cause the one or more processors to perform the steps of claim 5.

23. A computer-readable non-transitory storage medium containing one or more sequences of machine-readable instructions that, when executed by one or more processors, cause the one or more processors to perform the steps of claim 6.

24. A computer-readable non-transitory storage medium containing one or more sequences of machine-readable instructions that, when executed by one or more processors, cause the one or more processors to perform the steps of claim 7.

25. A computer-readable non-transitory storage medium containing one or more sequences of machine-readable instructions that, when executed by one or more processors, cause the one or more processors to perform the steps of claim 8.

26. A computer-readable non-transitory storage medium containing one or more sequences of machine-readable instructions that, when executed by one or more processors, cause the one or more processors to perform the steps of claim 9.

27. A computer-readable non-transitory storage medium containing one or more sequences of machine-readable instructions that, when executed by one or more processors, cause the one or more processors to perform the steps of claim 10.

28. A computer-readable non-transitory storage medium containing one or more sequences of machine-readable instructions that, when executed by one or more processors, cause the one or more processors to perform the steps of claim 11.

29. A computer-readable non-transitory storage medium containing one or more sequences of machine-readable instructions that, when executed by one or more processors, cause the one or more processors to perform the steps of claim 12.

30. A computer-readable non-transitory storage medium containing one or more sequences of machine-readable instructions that, when executed by one or more processors, cause the one or more processors to perform the steps of claim 13.

31. A computer-readable non-transitory storage medium containing one or more sequences of machine-readable instructions that, when executed by one or more processors, cause the one or more processors to perform the steps of claim 14.

32. A computer-readable non-transitory storage medium containing one or more sequences of machine-readable instructions that, when executed by one or more processors, cause the one or more processors to perform the steps of claim 15.

33. A computer-readable non-transitory storage medium containing one or more sequences of machine-readable instructions that, when executed by one or more processors, cause the one or more processors to perform the steps of claim 16.

34. A computer-readable non-transitory storage medium containing one or more sequences of machine-readable instructions that, when executed by one or more processors, cause the one or more processors to perform the steps of claim 17.

* * * * *